(12) United States Patent
Aissi et al.

(10) Patent No.: US 8,795,388 B2
(45) Date of Patent: *Aug. 5, 2014

(54) METHOD, APPARATUS AND SYSTEM FOR REMOTE MANAGEMENT OF MOBILE DEVICES

(71) Applicant: Intel Corporation, Santa Clara, CA (US)

(72) Inventors: Selim Aissi, Menlo Park, CA (US); Jasmeet Chhabra, Hillsboro, OR (US); Gyan Prakash, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/672,345

(22) Filed: Nov. 8, 2012

(65) Prior Publication Data

US 2013/0125218 A1 May 16, 2013

Related U.S. Application Data

(63) Continuation of application No. 12/317,222, filed on Dec. 19, 2008, now Pat. No. 8,321,916.

(51) Int. Cl.
*G08B 21/20* (2006.01)
(52) U.S. Cl.
USPC .......................................................... 726/35
(58) Field of Classification Search
None
See application file for complete search history.

(56) References Cited

U.S. PATENT DOCUMENTS

| | | | |
|---|---|---|---|
| 4,271,487 A * | 6/1981 | Craycraft et al. | 365/185.07 |
| 5,485,623 A * | 1/1996 | Kurokawa et al. | 714/22 |
| 5,513,244 A * | 4/1996 | Joao et al. | 455/404.1 |
| 5,917,405 A * | 6/1999 | Joao | 340/426.17 |
| 6,018,800 A * | 1/2000 | Ruckdashel | 726/35 |
| 6,360,333 B1 * | 3/2002 | Jansen et al. | 714/25 |
| 6,507,909 B1 * | 1/2003 | Zurko et al. | 713/164 |
| 6,954,147 B1 * | 10/2005 | Cromer et al. | 340/568.1 |
| 7,062,783 B1 * | 6/2006 | Joiner | 726/23 |
| 7,184,750 B2 * | 2/2007 | Tervo et al. | 455/410 |
| 2003/0229467 A1 * | 12/2003 | Lara | 702/119 |
| 2005/0251868 A1 * | 11/2005 | James | 726/35 |
| 2006/0041746 A1 * | 2/2006 | Kirkup et al. | 713/168 |
| 2006/0224897 A1 * | 10/2006 | Kikuchi et al. | 713/182 |
| 2007/0249322 A1 * | 10/2007 | Benco et al. | 455/410 |
| 2008/0089255 A1 * | 4/2008 | Graves et al. | 370/310 |
| 2008/0207202 A1 * | 8/2008 | Zellner et al. | 455/435.1 |
| 2008/0229433 A1 * | 9/2008 | Chen | 726/35 |
| 2009/0260088 A1 * | 10/2009 | Quach | 726/26 |
| 2012/0317651 A1 * | 12/2012 | Saito | 726/27 |
| 2013/0237145 A1 * | 9/2013 | Tischer et al. | 455/7 |

* cited by examiner

*Primary Examiner* — Peter Poltorak
(74) *Attorney, Agent, or Firm* — Schwabe, Williamson & Wyatt, P.C.

(57) ABSTRACT

An apparatus and system for enabling users to remotely manage their devices. Specifically, in one embodiment, in the event of a theft of a device or other such occurrence, a user may send a command to the device to execute a specified command. The command may include actions such as locking the device, shutting down the device, disabling logon's to the device and other such actions that may secure the device and the data on the device from unauthorized access. Upon receipt of an authorized unlock credential, the device may once again be made accessible.

21 Claims, 6 Drawing Sheets

METHOD, APPARATUS AND SYSTEM FOR REMOTE MANAGEMENT OF MOBILE DEVICES

BACKGROUND

Computing devices such as personal computers, laptops, mobile internet devices and personal digital assistants have become increasingly common in society today. With the increased proliferation and use of these devices comes an increased concern over security, both of the devices themselves and the data stored on those devices. While users may attempt to protect their devices and data with passwords and other such security schemes, there is little protection available to the user if their device is stolen.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Figure 1:
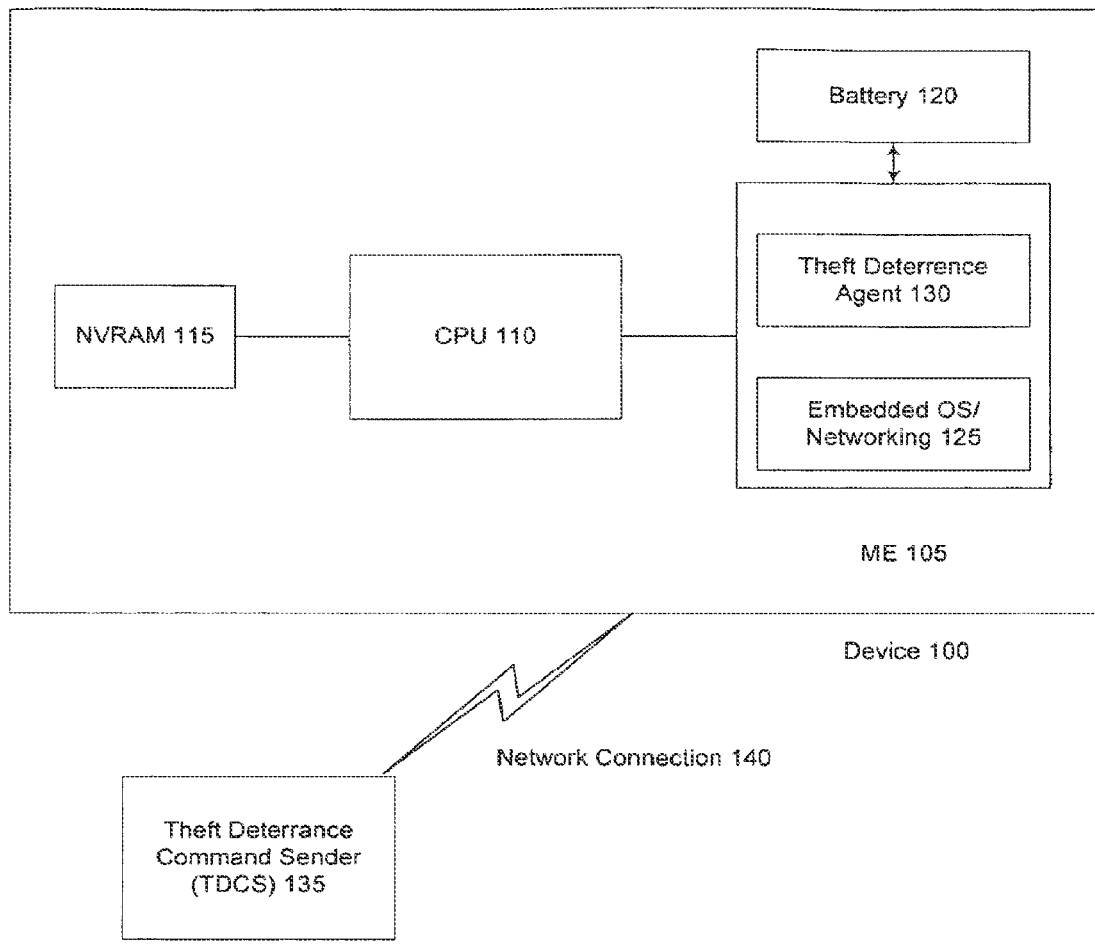
FIG. 1 illustrates a system capable of receiving commands directly from a user according to an embodiment of the present invention.

Embodiments of the present invention include a method, apparatus and system for a provider-independent scheme for remote management of devices. More specifically, embodiments of the present invention enable a user to send commands to a remote device over a variety of networks, to prevent unauthorized use of the device. As used in this specification, the phrases "one embodiment" or "an embodiment" of the present invention means that a particular feature, structure or characteristic described in connection with the embodiment is included in at least one embodiment of the present invention. Thus, the appearances of the phrases "in one embodiment," "according to one embodiment" or the like appearing in various places throughout the specification are not necessarily all referring to the same embodiment.

The following is an overview of embodiments of the present invention. For the purposes of clarity, the following description may be written in terms of a "wireless device" and "wireless networks" or wireless standards, but embodiments of the invention are not so limited. Instead, reference in the specification to the terms "device", "apparatus" and/or "machine" may include any one of a number of processor based computing devices, including but not limited to desktop computing devices, portable computing devices (laptops as well as handhelds), set-top boxes, and game consoles. Additionally, handheld devices may include, but are not limited to, personal digital assistants (PDAs), mobile internet devices (MIDs), laptops, digital cameras, media players, ultra mobile personal computers (UMPCs) and/or any computing device that is capable of roaming on, and connecting to, a network. Finally, reference to a "network" may include one or more private and/or public networks, local area networks (LANs) and/or wide area networks (WANs), wire-based and/or wireless networks such as Global System for Mobile Communications (GSM) networks, Wi-Fi networks (IEEE 802.11 technologies) and Wi-MAX (Worldwide Interoperability for Microwave Access) networks (IEEE 802.16 technologies).

As previously discussed, prevention of device and data theft is becoming an increasingly important area of interest as computing devices proliferate society. Various anti-theft and/or security schemes have been devised to attempt to alleviate the issue. One such unique scheme is described in co-pending U.S. patent application Ser. No. 11/904,793, entitled "Theft-Deterrence Method and Apparatus For Processor Based Devices" (hereafter "Theft-Deterrence Application", filed on Sep. 28, 2007, and assigned to the assignee of the present application. This scheme involves a user subscribing to a specialized service to monitor his/her device or for a corporation to run a server to monitor the devices of its employees. The scheme in the TD App requires continuous monitoring of the device and if a device indicates that its "theft status" is "stolen", then the device may reboot.

Embodiments of the present invention provide a theft deterrent scheme that allows a user to send messages directly to a device and specify an action, without any server and/or a service provider intervention. Although the following embodiments are described in terms of users interacting directly with their devices, alternate embodiments of the invention may in fact co-exist with schemes such as those described in the TD App. Thus, for example, a corporation may monitor all devices belonging to its employees, but if stolen, the employee may also directly send messages to the device. If, however, the device is stolen and the employee is unaware of the theft for a length of time, the corporate service may nonetheless detect the theft and take action as described in the TD App.

In embodiments of the present invention, if a user discovers his or her device stolen, he or she may send a message directly (i.e., bypassing a corporate server and/or a service provider) to the device utilizing a cellular phone or other such mobile device, to secure the stolen device in one of a variety of ways such as shutting down the system, deleting files, deleting the disk and/or deleting the encryption key, if any, on the device. According to embodiments of the present invention, an embedded processor and a theft deterrence agent ("TDA") may be implemented in the device and the TDA may be capable of receiving messages from a mobile device such as a cellular telephone. The message may be sent via Short Message Service ("SMS"), Internet Protocol ("IP") or other equivalent communications protocols that allow cell phones and/or other mobile devices to interact with each other via text messaging. A user may therefore directly access the device and remotely manage and secure the device. Hereafter, the embedded processor may be referred to as a "manageability engine" or "ME" and the terms may include any embedded processors capable of implementing the functionality described herein.

Embodiments of the invention may utilize the ME to manage communications directly between a message sender and a device, without any intervention from a server and/or a service provider. According to an embodiment of the present invention, an encryption scheme on the device may be responsible for authenticating an out of band (i.e., independent of the CPU), service-independent message to the device and enforcing the message command that is received. In one embodiment, the encryption mechanism may comprise a scheme such as Intel™ Corporation's Danbury Technology and a TDA. The TDA may run on the embedded processor and ensure that a sender's cryptographic or theft deterrent commands are securely received by the device. The TDA is responsible for authentication and for following the theft deterrence command. Upon receiving the command, the TDA will power on the system (if necessary) to access disk and it's contents, to take actions such as file deletion, disk key deletion and other such actions that may secure the data on the device.

Thus, for example, if a laptop is stolen, in one embodiment of the invention, the device may include a "System Lockdown Agent" (SLA) which when triggered by the device owner via the TDA, may lockdown the laptop by controlling the system and CPU reset hardware line. Alternatively, the laptop owner may send secure commands to the laptop to manage the encryption keys, delete files, delete the disk and/or delete the encryption key. The end result is a scheme for users to manage their devices remotely, to prevent data on the laptop from falling into the wrong hands, without any server and/or service provider intervention.

In an embodiment, the SLA and/or ME may utilize non-volatile RAM (NVRAM) to store the device state information for rebooting and/or restoring the device. In an alternate embodiment, the SLA and ME may include a battery that is separate from the battery utilized by the main CPU, to ensure the SLA and/or the embedded processor are always operational, irrespective of whether the main CPU is powered up. Further details of these embodiments are described below.

FIG. 1 illustrates a system capable of receiving commands directly from a user according to the present invention. As illustrated, a device ("Device 100") may include an embedded processor ("ME 105"). ME 105 may be independent of the main CPU ("Main CPU 110") and coupled to a non-volatile RAM ("NVRAM 115"). In one embodiment, ME 105 may be powered by separate battery ("Battery 120"), either continuously or only when the device is in power off state. In this latter scenario, ME 105 may be always "awake" on the device, i.e., it may continuously monitor for messages, regardless of the power state of Main CPU 110. ME 105 may include an embedded operating system (OS) with networking stacks (collectively "OS/Networking 125") and a Theft Deterrence Agent ("TDA 130") which may be responsible for authenticating, acknowledgement and following the commands sent by the owner of Device 100 (illustrated as the Theft Deterrence Command Sender ("TDCS 135")).

TDCS 135 may utilize a cell phone or other computing device connected to Device 100 via a GSM, WiFi, WiMax and/or a wired network. TDCS 135 may send the command over a network connection (illustrated as "Network Connection 140") to TDA 130 and the command may include a predefined authentication scheme such pass phrase, username and/or a certificate to ensure security of the network connection by validating TDCS 135's identity. TDA 130 may authenticate the command and if authenticated, TDA 130 may then continue to perform the action specified by the command.

Figure 2:
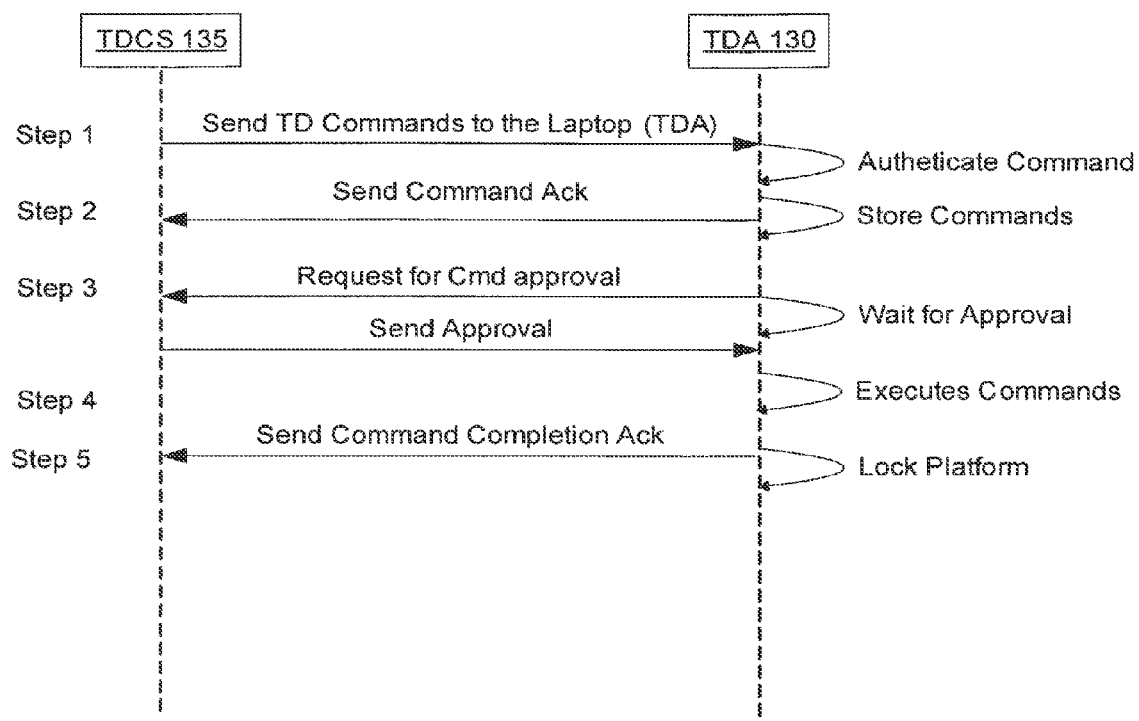
FIG. 2 illustrates a sequence diagram that describes an the steps that occur in the event a user realizes that he/she has misplaced a device including a theft deterrence agent.

FIG. 2 illustrates further how the system in FIG. 1 may operate to enable a user to monitor a device including a theft deterrence agent. Specifically, FIG. 2 illustrates a sequence diagram that describes an the steps that occur in the event a user realizes that he/she has misplaced a device including a theft deterrence agent. In such a scenario, as soon as TDCS 135 realizes that Device 100 is lost, in one embodiment, TDCS 135 may utilize a cell phone or other such device to send a message to Device 100 over a network such as Network Connection 140 (illustrated as Step 1). As previously discussed, this message may be sent via SMS, IP or other such comparable communications protocols. The message to Device 100 may include a command to TDA 130 to perform one or more actions, including turning on the power for Device 100 (assuming it is powered down), deleting files, deleting disk keys and/or locking the system.

In Step 2, upon receipt of the command, TDA 130 may authenticate the command against ME 105 using a predefined security protocol. In one embodiment, the predefined security protocol may include encryption and authentication technologies such as Intel™ Corporation's Danbury Technology. Authentication schemes are well known in the art and further description thereof is omitted herein in order not to obscure embodiments of the invention. Once TDA 130 authenticates the command, TDA 130 may send TDCS 135 an acknowledgement and a request for approval of the command in Step 3.

In one embodiment, in Step 4, upon receipt of the command approval from TDCS 135, TDA 130 may perform the action(s) defined by the command, including turning on the power for Device 100 (assuming it is powered down), deleting files, deleting disk keys and/or locking the system. Further details of locking down the system are described later in this specification. TDA 130 may send an acknowledgement to TDCS 135 when it completes each command in Step 5 and in an embodiment, TDA 130 may additionally send a final message of completing the commands. Device 100 may thereafter be disabled (e.g., shutdown, locked or disabled).

Figure 3:
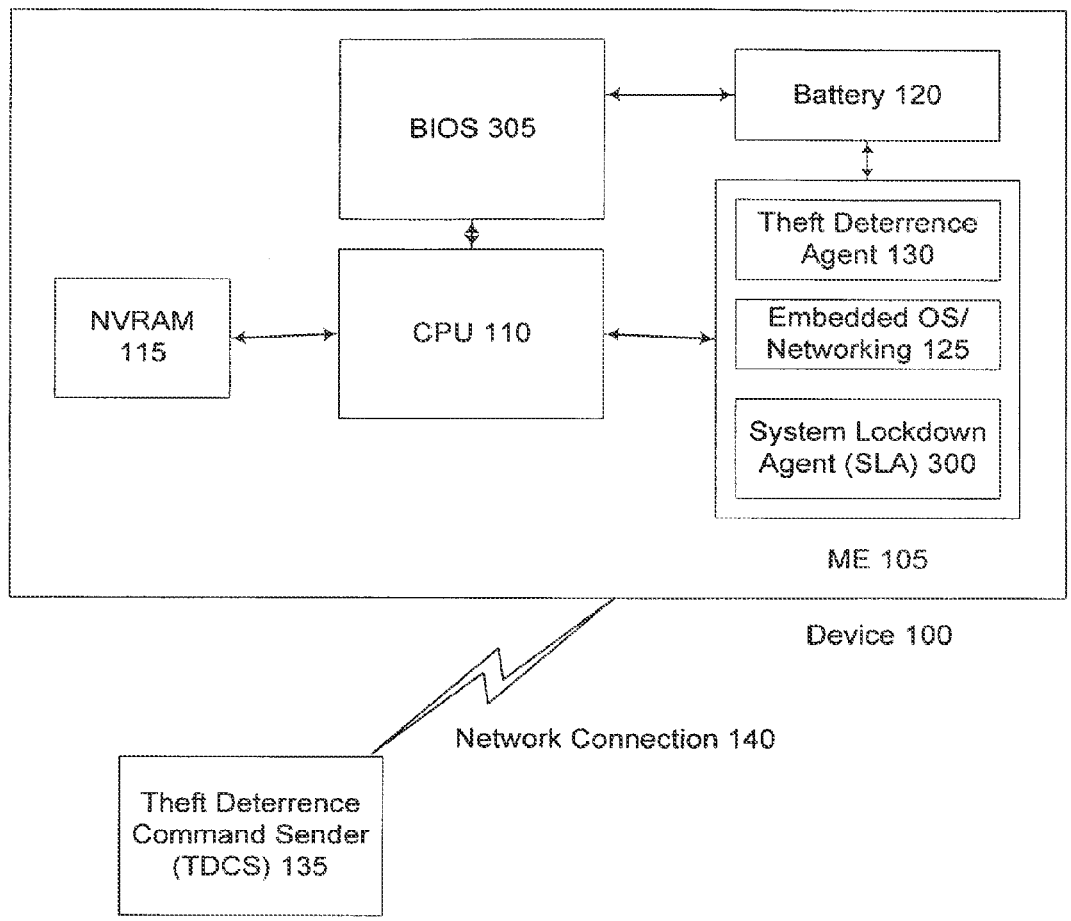
FIG. 3 illustrates a device having a system lockdown agent according to an embodiment of the present invention.

FIG. 3 illustrates a device having a system lockdown agent according to an embodiment of the invention. Specifically, according to this embodiment, in addition to the components illustrated in FIG. 1, Device 100 may also include a System Lockdown Agent ("SLA 300"), which may be triggered locally or remotely to lockdown Device 100. If the command from TDCS 135 includes a lockdown instruction, TDA 130 may communicate with SLA 300 to lockdown Device 100 by controlling the system and CPU 105's reset hardware line. For the purposes of this application, "system lockdown" may include rendering Device 100 unable to boot any OS and use the platform, except for limited recovery operations (described in further detail below). Although SLA 300 is illustrated in FIG. 3 as residing within ME 105, embodiments of the invention are not so limited. Instead, in alternate embodiments, SLA 300 may be coupled to ME 105 but reside outside ME 105, preferably but not necessarily within secure hardware and/or location on Device 100. Although this configuration may not be as secure as the former, embodiments of the invention may nonetheless be implemented without significant changes.

If SLA 300 resides within ME 105, it may also have access to the separate battery that is coupled to ME 105. If, however, SLA 300 resides outside ME 105, it may nonetheless share the separate battery with ME 105. In one embodiment, this enables SLA 300 to continue running even if Device 100 is unable to reboot. In an alternate embodiment, if SLA 300 resides outside ME 105 and is unable to share the separate battery with ME 105, SLA 300 may store the device state at lockdown (lockdown state) in NVRAM 115, which enables SLA 300 to reinitiate system lockdown on the next boot cycle as needed.

Figure 4:
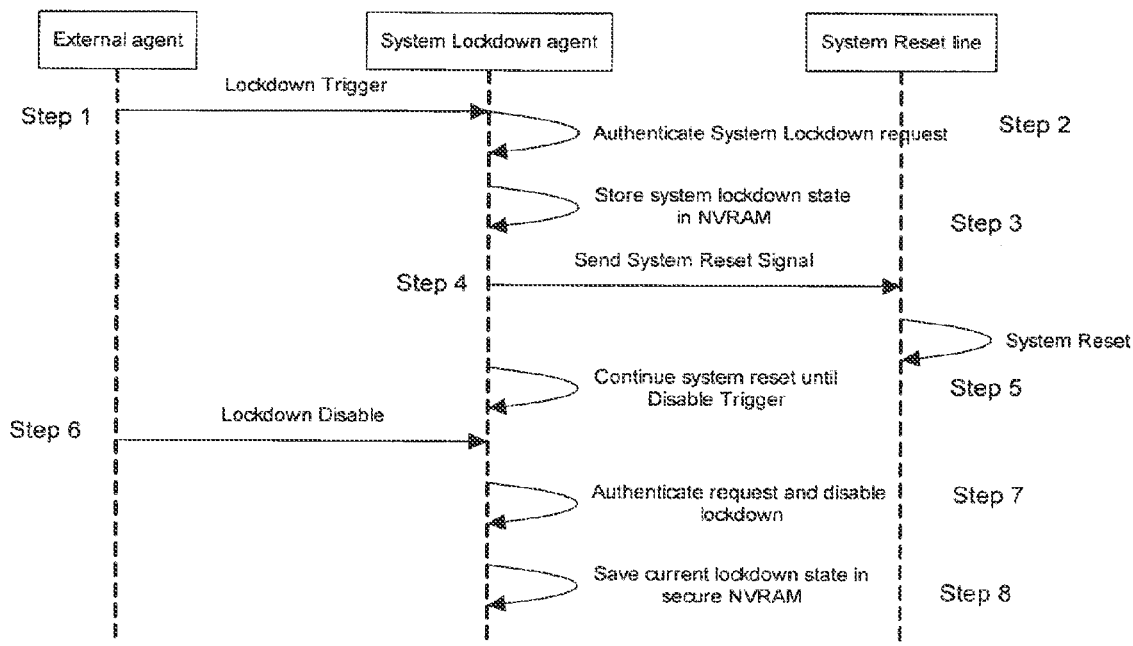
FIG. 4 illustrates a sequence diagram that describes how the system lockdown agent in FIG. 3 may shutdown a device.

FIG. 4 illustrates further how the system lockdown agent in FIG. 3 may shutdown a device. In Step 1, a request may be received by the SLA via TDA to lockdown Device 100. The communication between SLA and TDA may occur via a variety of communications lines including, but not limited to the system bus and/or memory. In Step 2, SLA 300 may authenticate the system lockdown request. In one embodiment, if SLA 300 does not have access to a separate battery from CPU 105's battery, then SLA 300 may store the lockdown state in NVRAM 115 in Step 3. If, however, SLA 300 does have access to Battery 120, then SLA 300 may proceed directly to Step 4 and send a system reset signal using the system reset line. SLA 300 may additionally ensure that the system is locked before Basic Input Output System ("BIOS 305" in FIG. 3) Power on Self Test ("POST") completion and ensures that the system cannot be booted using a hard disk drive ("HDD", external Universal Serial Bus ("USB") device, CD-ROM drive or other such devices. Thereafter, in Step 5, SLA 300 may continue to either read the current lockdown state from NVRAM 115 or maintain its then-executing state. In either scenario, the system may remain inoperable until the lockdown is disabled.

In Step 6, if a user desires to recover the system, a system lockdown disable message may be received. In this scenario, Device 100 may be restored by following a challenge-response mechanism that uses questions and/or answers that were configured during service activation by the user. In an alternate embodiment, the challenge response mechanism may also be a recover token that the user may obtain by contacting support personnel via telephone or other such out of band mechanism.

In one embodiment, a recovery scheme similar to that described in the co-pending P26445 App may be adapted for use here. BIOS 305 may be responsible for rebooting Device 100 by obtaining a system lockdown status from ME 105. If the system lockdown status indicates that Device 100 has been stolen, ME 105 may inform BIOS 305 of the status and BIOS 305 may then request TDCS 135 to provide an unlock credential which BIOS 305 may then provide to TDA 130. TDA 130 may then compare the unlock credential to the previously provisioned unlock credential. In one embodiment, the unlock credential may have been previously provisioned to ME 105 in any one of a number of ways, including but not limited to having TDCS 135 provide it to ME 105 during initial set up of Device 100.

In the event the system is not restored, Step 5 may continue until a system lockdown disable message is received. Upon receipt of the system lockdown disable message, in Step 7, the request may be authenticated by SLA 300. If the authentication is successful in Step 8, the system lockdown may be disabled. In one embodiment, if SLA 300 does not have access to a separate battery from CPU 105's battery, then SLA 300 may store the current state in NVRAM 115.

Figure 5:
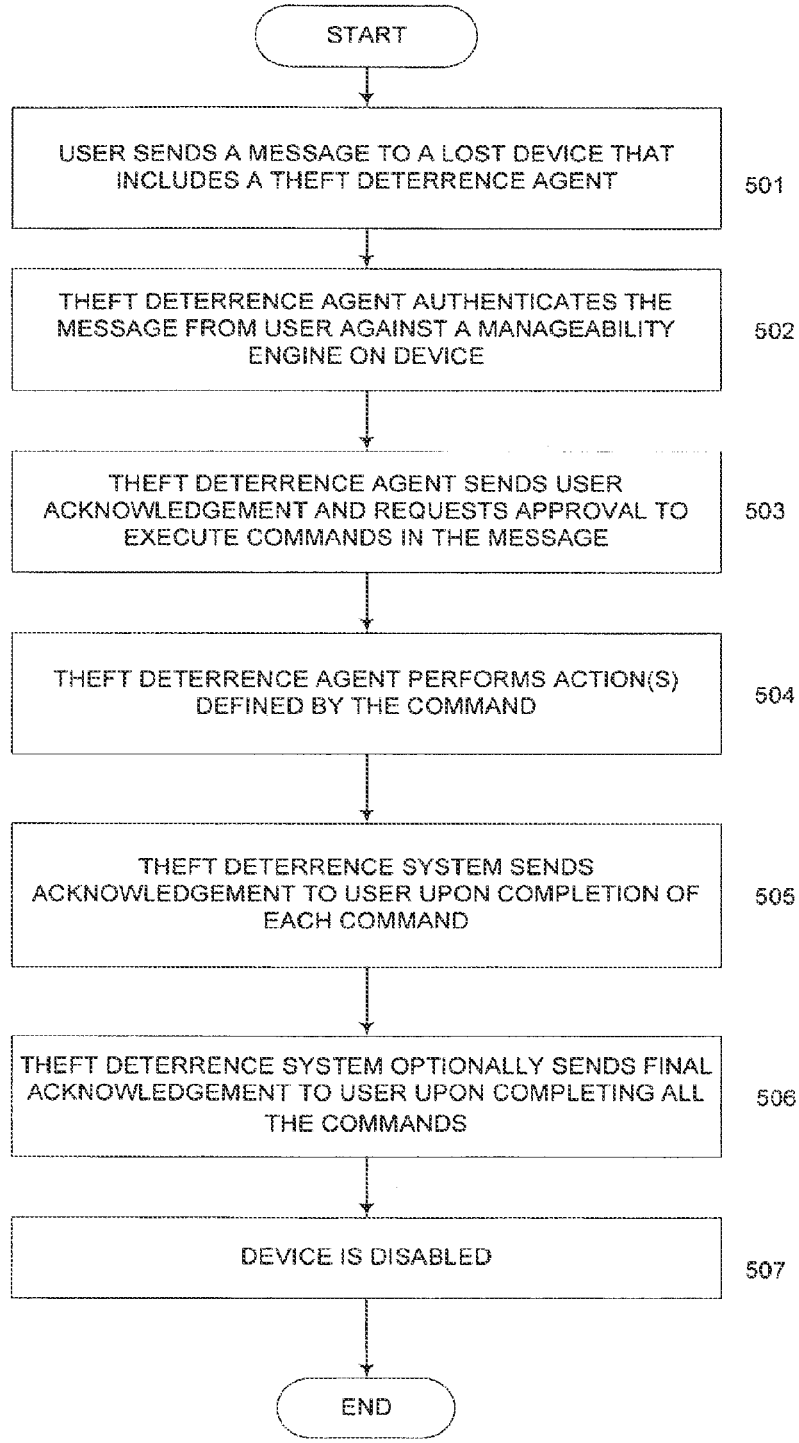
FIG. 5 is a flow chart illustrating how a device may be monitored by a theft deterrence agent according to an embodiment of the present invention.

FIG. 5 is a flowchart illustrating how a device having a theft deterrence agent may be monitored according to an embodiment of the present invention. Although the following operations may be described as a sequential process, many of the operations may in fact be performed in parallel and/or concurrently. In addition, one or more embodiments, the order of the operations may be re-arranged without departing from the spirit of embodiments of the invention. Upon realizing that a device that includes a TDA has been misplaced, in 501, a user may utilize a cell phone or other such device to send a message to the device over a network. In 502, upon receipt of the command, the TDA may authenticate the command against an ME using a predefined security protocol. Once the TDA 130 has authenticates the command, the TDA may send the user an acknowledgement and a request for approval of the command in 503.

In one embodiment, in 504, upon receipt of the command approval from the user, the TDA may perform the action(s) defined by the command, including turning on the power for the device (assuming it is powered down), deleting files, deleting disk keys and/or locking the system. The TDA may send an acknowledgement to the user in 505, when it completes each command and in an embodiment, in 506, the TDA may optionally send a final message of completing the commands. Device 100 may thereafter be disabled (e.g., shutdown, locked or disabled) in 507.

Figure 6:
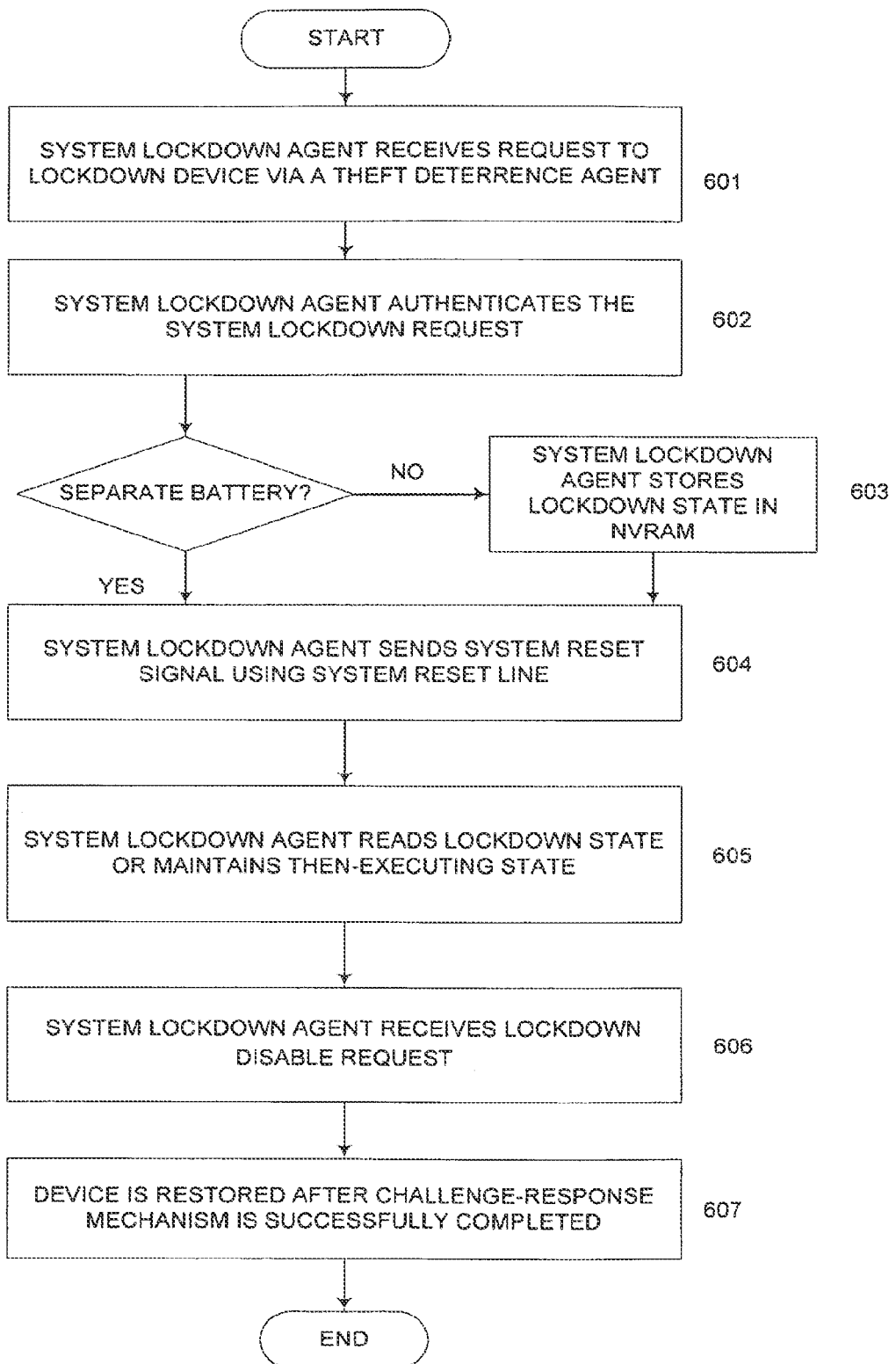
FIG. 6 is a flowchart illustrating how a system lockdown agent may shutdown and recover a device according to an embodiment of the present invention.

FIG. 6 is a flowchart illustrating how a system lockdown agent may shutdown and recover a device according to an embodiment of the present invention. Once again, although the following operations may be described as a sequential process, many of the operations may in fact be performed in parallel and/or concurrently. In addition, one or more embodiments, the order of the operations may be re-arranged without departing from the spirit of embodiments of the invention. In 601, a request may be received by the SLA via TDA to lockdown a device. The SLA may authenticate the system lockdown request in 602 and in 603, if SLA 300 does not have access to a separate battery from the CPU, then the SLA may store the lockdown state in NVRAM. If, however, the SLA does have access to a separate battery from the CPU, then the SLA may proceed directly to 604 and send a system reset signal using the system reset line. Thereafter, in 605, the SLA may continue to either read the current lockdown state from NVRAM 115 or maintain its then-executing state. In either scenario, the system may remain inoperable until the lockdown is disabled. In 606, a system lockdown disable message may be received by a user to recover the system. The device may be restored in 607 by following a challenge-response mechanism that uses questions and/or answers that were configured during service activation by the user. In an alternate embodiment, the challenge response mechanism may also be a recover token that the user may obtain by contacting support personnel via telephone or other such out of band mechanism.

The scheme according to embodiments of the present invention may be implemented on a variety of computing devices. According to an embodiment, a computing device may include various other well-known components such as one or more processors which can be specialized Reduced Instruction Set Computer (RISC) engines or general purpose processing engines. The processor(s) and machine-accessible media may be communicatively coupled using a bridge/memory controller, and the processor may be capable of executing instructions stored in the machine-accessible media. The bridge/memory controller may be coupled to a graphics controller, and the graphics controller may control the output of display data on a display device. The bridge/memory controller may be coupled to one or more buses. One or more of these elements may be integrated together with the processor on a single package or using multiple packages or dies. A host bus controller such as a Universal Serial Bus ("USB") host controller may be coupled to the bus(es) and a plurality of devices may be coupled to the USB. For example, user input devices such as a keyboard and mouse may be included in the computing device for providing input data. In alternate embodiments, the host bus controller may be compatible with various other interconnect standards including Ethernet, Gigabit Ethernet, PCI, PCI Express, FireWire and other such existing and future standards.

In the foregoing specification, the invention has been described with reference to specific exemplary embodiments thereof. It will, however, be appreciated that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method, comprising:
    continuously monitoring, by a theft deterrence agent on a device, for messages including at least one command specifying an action to secure the device, the theft deterrence agent executing on an embedded processor included in the device, the embedded processor operating independently from a central processing unit (CPU) included in the device, the CPU having an operating system configured to operate the device when executing on the CPU, the embedded processor having another operating system that is separate from the operating system and configured to operate the theft deterrence agent when executing on the embedded processor;
    receiving, by the theft deterrence agent on the device, a message directly from another device via a secure network connection, the message including the at least one command specifying an action to secure the device, the action including one of deleting files, deleting a disk or deleting an encryption key;
    executing, by the theft deterrence agent on the device, the at least one command in the message to delete files, a disk or an encryption key, the executing including powering on the device to enable the command be executed, upon determination that the device is powered down; and
    sending, by the theft deterrence agent on the device, an acknowledgement upon completion of executing the at least one command in the message.

2. The method according to claim 1 further comprising:
    requesting approval from the another device to execute the at least one command in the message prior to executing the at least one command in the message; and
    receiving the approval to execute the at least one command in the message.

3. The method according to claim 1, wherein the action specified by the at least one command comprises a system lockdown.

4. The method according to claim 3 further comprising:
    transmitting the system lockdown message from the theft deterrence agent to a system lockdown agent;
    storing device state information in a non-volatile random access memory if the system lockdown agent is missing access to a continuously running battery on the device; and
    sending a system reset signal to a system reset line on the device to shutdown the device.

5. The method according to claim 4, further comprising receiving an authorized unlock credential to disable the system lockdown and restore the state information on the device.

6. The method according to claim 5, wherein disabling the system lockdown further comprises:
    authenticating the unlock credential against a previously provisioned unlock credential on the device, wherein the previously provisioned unlock credential is stored in the secure embedded processor.

7. The method according to claim 6 further comprising:
    restoring the state information on the device; and
    storing the restored device state information in the non-volatile random access memory if the system lockdown agent is missing access to the continuously running battery on the device.

8. An apparatus, comprising:
    a secure embedded processor; and
    a theft deterrence agent coupled to the secure embedded processor,
    the theft deterrence agent to:
        continuously monitor for messages including at least one command specifying an action to secure the device;
        receive a message directly from another apparatus via a secure network connection, the message including the at least one command specifying an action to secure the device, wherein the action includes one of delete files, delete a disk or delete an encryption key;
        authenticate the message against the secure embedded processor via a secure protocol;
        execute the at least one command in the message to delete files, a disk or an encryption key, wherein to execute includes power on the apparatus to enable the command be executed, upon determination the apparatus is powered down; and
        send an acknowledgement to the user upon completion of executing the at least one command in the message,
        wherein the theft deterrence agent is to execute on the embedded processor included in the apparatus, the embedded processor operating independently from a central processing unit (CPU) included in the apparatus, the CPU having an operating system to operate the apparatus when executing on the CPU, the embedded processor having another operating system that is separate from the operating system and to operate the theft deterrence agent when executing on the embedded processor.

9. The apparatus according to claim 8, wherein
    the theft deterrence agent is to request approval from the another apparatus to execute the at least one command in the message prior to executing the at least one command in the message,
    the theft deterrence agent is to receive the approval to execute the at least one command in the message.

10. The apparatus according to claim 8, wherein the theft deterrence agent is to execute a system lockdown command in the message to lockdown the apparatus.

11. The apparatus according to claim 10 further comprising:
    a system lockdown agent coupled to the embedded processor,
    the system lockdown agent to receive the system lockdown message from the theft deterrence agent;
    the system lockdown agent further capable of storing to store device state information in a non-volatile random access memory if the system lockdown agent is missing access to a continuously running battery on the apparatus,
    the system lockdown agent additionally capable of sending to send a system reset signal to a system reset line on the apparatus to shutdown the apparatus.

12. The apparatus according to claim 11, wherein the system lockdown agent is to receive an authorized unlock credential to disable the system lockdown and restore the state information on the apparatus.

13. The apparatus according to claim 12, wherein the system lockdown agent is to disable the system lockdown;
    wherein to disable includes to authenticate the unlock credential against a previously provisioned unlock credential on the apparatus, wherein the previously provisioned unlock credential is stored in the secure embedded processor.

14. The apparatus according to claim 13 wherein the system lockdown agent is to:
    restore the state information on the apparatus; and store the restored device state information in the non-volatile random access memory if the system lockdown agent is missing access to the continuously running battery on the apparatus.

15. A non-transitory machine accessible medium having stored thereon instructions that, when executed by a machine, cause the machine to enable a device to:
- continuously monitor for messages including at least one command specifying an action to secure the device;
- receive in a theft deterrence agent on a device a message directly from another device via a secure network connection, the message including the at least one command specifying an action to secure the device, wherein the action includes one of delete files, delete a disk or delete an encryption key;
- authenticate the message against a secure embedded processor via a secure protocol;
- execute the at least one command in the message to delete files, a disk or an encryption key, wherein to execute includes power on the device to enable the command be executed, upon determination that the device is powered down; and
- send an acknowledgement upon completion of executing the at least one command in the message,
- wherein the theft deterrence agent is to execute on the embedded processor included in the device, the embedded processor operating independently from a central processing unit (CPU) included in the device, the CPU having an operating system to operate the device when executing on the CPU, the embedded processor having another operating system that is separate from the operating system and to operate the theft deterrence agent when executing on the embedded processor.

16. The non-transitory machine accessible medium according to claim 15, wherein the instructions, when executed by the machine, further cause the machine to:
- request approval from the another device to execute the at least one command in the message prior to executing execution of the at least one command in the message; and
- receive approval to execute the at least one command in the message.

17. The non-transitory machine accessible medium according to claim 16, wherein the instructions, when executed by the machine, further cause the machine to execute a system lockdown command in the message.

18. The non-transitory machine accessible medium according to claim 17, wherein the instructions, when executed by the machine, further cause the machine to:
- transmit the system lockdown message from the theft deterrence agent to a system lockdown agent;
- store device state information in a non-volatile random access memory if the system lockdown agent is missing access to a continuously running battery on the device; and
- send a system reset signal to a system reset line on the device to shutdown the machine.

19. The non-transitory machine accessible medium according to claim 18, wherein the instructions, when executed by the machine, further cause the machine to receive an authorized unlock credential to disable the system lockdown and restore the state information on the machine.

20. The non-transitory machine accessible medium according to claim 15, wherein the instructions, when executed by the machine, further cause the machine to disable the system lockdown, wherein to disable includes to authenticate the unlock credential against a previously provisioned unlock credential on the device, wherein the previously provisioned unlock credential is stored in the secure embedded processor.

21. The non-transitory machine accessible medium according to claim 20, wherein the instructions, when executed by the machine, further cause the machine to:
- restore the state information on the machine; and
- store the restored device state information in the non-volatile random access memory if the system lockdown agent is missing access to the continuously running battery on the machine.

* * * * *